Dec. 29, 1959 C. C. ORTEGA 2,918,732
EDUCATIONAL DEVICE HAVING TRANSPARENT ERASABLE SURFACE
AND MOVABLE ILLUSTRATION STRIP POSITIONED
BENEATH SAID WRITING SURFACE
Filed Nov. 22, 1957 2 Sheets-Sheet 1

Charlotte C. Ortega
INVENTOR.

BY
Attorneys

Dec. 29, 1959      C. C. ORTEGA      2,918,732
EDUCATIONAL DEVICE HAVING TRANSPARENT ERASABLE SURFACE
AND MOVABLE ILLUSTRATION STRIP POSITIONED
BENEATH SAID WRITING SURFACE
Filed Nov. 22, 1957      2 Sheets-Sheet 2
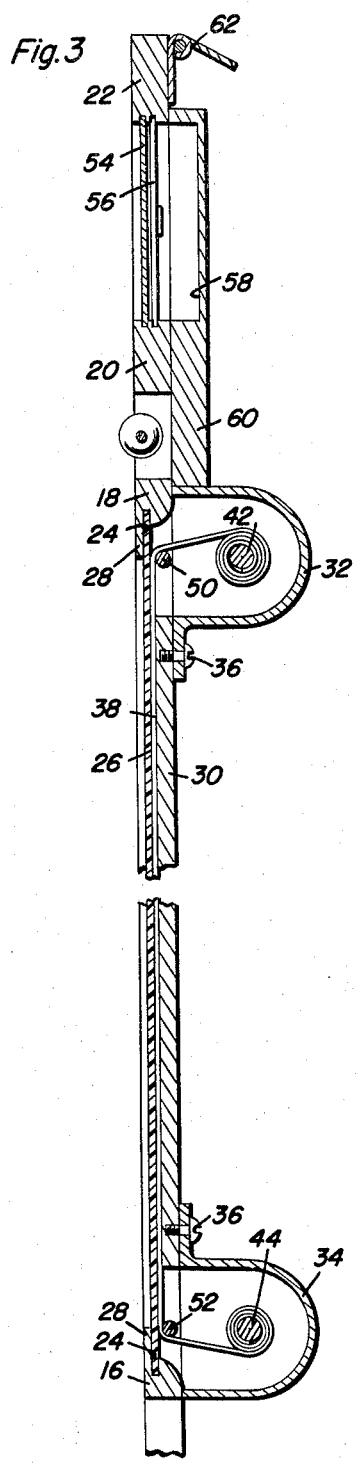
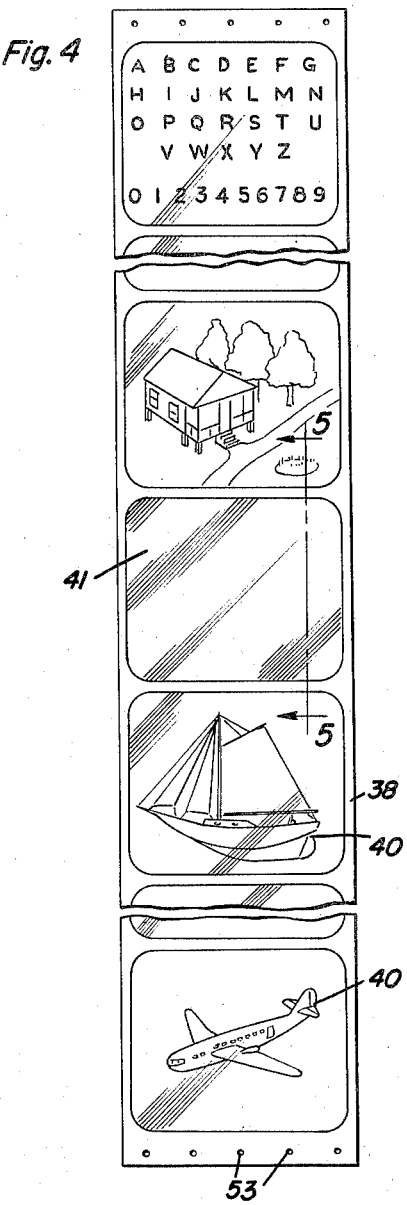
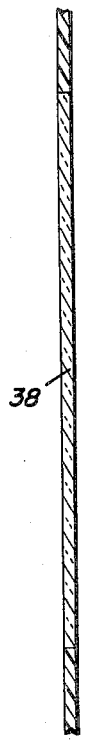
Charlotte C. Ortega
INVENTOR.
BY *Clarence A. O'Brien*
*and Harvey B. Jackson*
Attorneys

United States Patent Office 2,918,732
Patented Dec. 29, 1959

2,918,732

EDUCATIONAL DEVICE HAVING TRANSPARENT ERASABLE SURFACE AND MOVABLE ILLUSTRATION STRIP POSITIONED BENEATH SAID WRITING SURFACE

Charlotte C. Ortega, San Diego, Calif.

Application November 22, 1957, Serial No. 698,130

1 Claim. (Cl. 35—62)

This invention relates generally to an educational device, and more particularly to a device to aid in the instruction of children in the subjects of writing and drawing.

The primary object of this invention is to provide an educational device, wherein means are provided for the child to copy drawings on a transparent panel, which snugly overlies a previously prepared drawing, so that the child may trace the original drawing on the panel.

Another object of this invention is to provide a frame on which the educational device is mounted, having storage means for the apparatus to be used in connection with this device.

A further object of this invention is to provide an educational device wherein the prepared drawing is in the form of an elongated roll mounted on rollers, so that a child using this device may select any one of a predetermined number of panels having writing and drawings thereon.

A still further object of this invention is to provide a simple and inexpensive device and yet one which will be exceedingly effective for the purpose for which it is designed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged vertical sectional view taken substantially along the plane defined by reference line 3—3 of Figure 1, illustrating details of construction thereof;

Figure 4 is a front elevational view of the prepared panels having drawings and writing thereon which children are to copy on the transparent panels;

Figure 5 is a vertical sectional view, considerably enlarged, taken substantially along the plane defined by reference line 5—5 of Figure 4.

Figure 1:
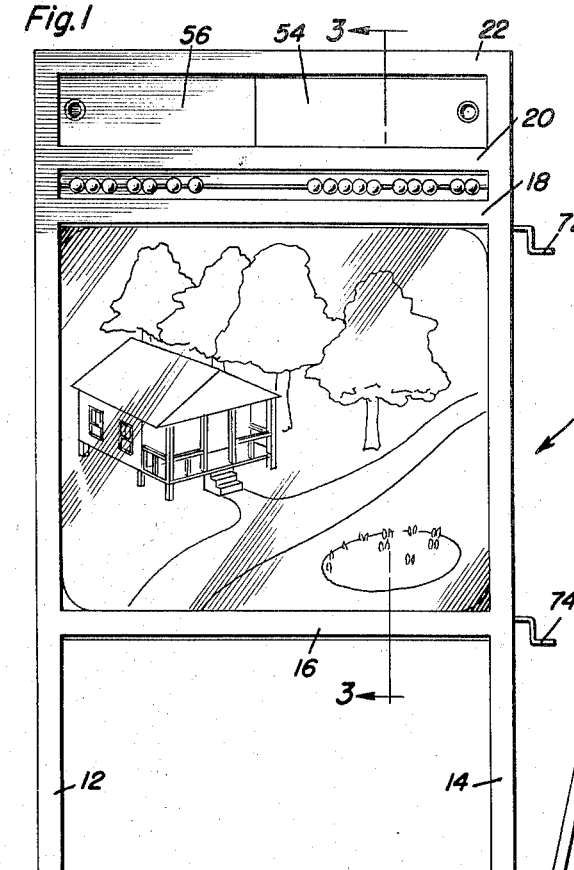
Figure 1 is a front elevational view of the educational device comprising the present invention.
Figure 2:
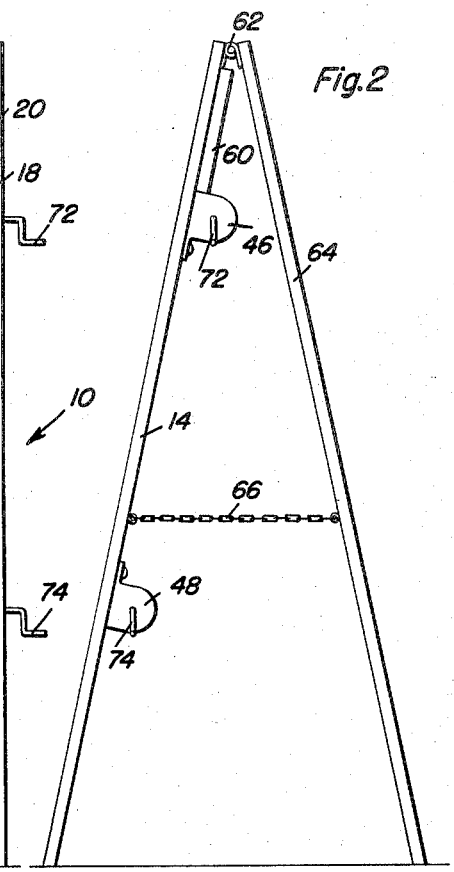
Figure 2 is a side elevational view of the device illustrated in Figure 1.

Referring now more specifically to the drawings, the numeral 10 generally designates the educational device comprising the present invention. This device is constructed of a frame which includes two vertically spaced parallel members 12 and 14, which are connected together by horizontal, parallel and spaced members 16, 18, 20, and 22. Members 16 and 18 have slots 24 formed therein which accommodate a transparent panel 26, which may be made of glass, plastic, or any other suitable material. It is to be noted that these slots 24 are parallel and horizontally disposed. Extending flanges 28 projecting from members 16 and 18 respectively, serve to hold panel 26 firmly and rigidly in place. A backing member 30 is connected to vertical members 12 and 14 respectively, and serves to support upper and lower housings 32 and 34 respectively which are connected to backing plate 30 by means of bolts 36.

A longitudinally extending sheet of plastic 38 of substantially the same width as transparent panel 26, has a plurality of drawing panels 40 formed thereon, which also include some writing panels. Each of these panels is substantially the same size as the exposed portion of transparent panel 26.

An upper roll 42 and lower roll 44 are disposed in upper and lower housings 32 and 34 respectively, and are rotatably accommodated in upper and lower projecting flange portions 46 and 48 respectively. The elongated sheet of plastic material 38, is wound between these rolls, and is passed over upper and lower pressure bars 50 and 52, which assure that this sheet is held in contact with the inner surface of transparent panel 26.

The upper and lower ends of sheet 38 are provided with a horizontal row of spaced openings 53, which serve to allow the sheet to be connected to the upper and lower rolls 42 and 44 respectively. It is to be noted that the transparent panel 26, is of the type on which written or printed indicia may be placed, so that a child with a pencil or crayon may trace the picture panels 40 of the roll 38, and then move blank panel 41 into place underneath transparent panel 26, so that the writings put on the transparent panel will be legible.

The upper surface of horizontal member 20, and the lower surface of horizontal member 22, are formed with slots therein, so as to accommodate slidable doors 54 and 56, which lead to a compartment 58, which is formed in a panel 60, connected above housing 32, and extending between horizontal members 20 and 22, and also connected to vertical members 12 and 14.

A hinge 62 has one side connected at the upper end of the vertical members 22, and the other side is connected to a rear leg or legs 64, which may have suitable horizontal members joining them so as to rigidify the rear leg 64. A chain 66 is connected between the front legs 12 and 14 and the rear legs 64, so as to limit their movement away from each other. Thus, it may be seen that the educational device 10 is a self-supporting device since it has front and rear legs to support itself.

Figure 6:
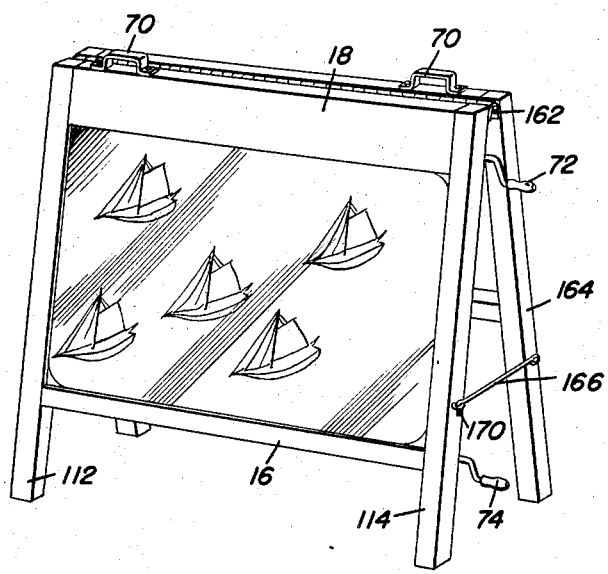
Figure 6 is a perspective view of the educational device, of the type to be used on tables or desks.

In Figure 6, may be seen a modified form of the device, which is constructed in exactly the same manner as the previously described device, except for the fact that the vertical legs 112 and 114 are much shorter so as to adapt this device for use on a desk or table top as differentiated from the previously described device which is to be used standing on the floor. This device has a rear leg 164, which is hinged to the front legs by means of a hinge 162. A hook 166 is connected to rear leg 164, and is engagable in an eye 170 on forward vertical leg 114, so as to rigidly fasten the forward and rearward legs together. The rest of the device is constructed the same as the previously mentioned device, except for the fact that carrying handles 70 are provided on this device.

In use, after the frame is set up, the crank handles 72 and 74 which are connected to upper and lower rolls 42 and 44 respectively, may be turned; however, it will be realized that only one of these crank handles may be turned at a time so that sheet 38 may be moved and a different picture panel 40 will take its place under the transparent panel 26. Then, a child by using a pencil or chalk may trace the picture panel and by moving sheet 38 so as to dispose blank panel 41 under transparent panel 26, the writings added thereto may be examined.

Naturally the panel 24 would have a rough writing surface, so that chalk will remain thereon and be legible until erased.

It may now be seen that I have herein shown and described a new and improved type of educational device which will teach children to draw and write.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An educational device comprising an inclined frame, a transparent writing surface fixedly mounted on said frame, a flexible strip underlying said surface said strip including a series of illustrations for selective alignment with said surface whereby the illustrations may be traced on said writing surface as desired, an upper and a lower roll rotatably mounted on said frame whereby said roll may be wound upon the upper or lower of said rolls, said strip including a blank area equivalent in size to the writing surface whereby tracings on said surface may be easily seen when said blank area is aligned with said surface, a backing plate mounted on said frame and underlying said writing surface in spaced parallelism for receiving the strip therebetween and holding the strip adjacent the undersurface of the writing surface, a pair of transversely extending hollow housings mounted on said backing member, each of said housings being generally U-shaped and opening toward the writing surface, said rollers being disposed in said housings, said housings having end walls journalling said rollers, a crank handle connected to each of said rollers for rotating the same, said housings projecting rearwardly of the backing member with the rollers supported rearwardly of the backing member, a pair of stationary transversely extending bars mounted on said frame, said bars being disposed adjacent the upper and lower edges of the writing surface and in close spaced relation thereto for guiding the strip behind the writing surface, said frame including a pair of depending supporting legs rigid therewith, a brace member pivotally connected to the upper end of the frame and supporting the frame and writing surface in inclined position, means interconnecting the frame and brace member to limit the rearward swinging movement of the brace member, said frame including a transverse compartment above the writing surface for receiving writing paraphernalia, and a pair of sliding closure panels for said compartment.

References Cited in the file of this patent
UNITED STATES PATENTS

| | | |
|---|---|---|
| 160,287 | Sheperd | Mar. 2, 1875 |
| 1,559,665 | Beery et al. | Nov. 3, 1925 |
| 1,680,056 | Mathias | Aug. 7, 1928 |
| 2,494,362 | Schatz | Jan. 10, 1950 |
| 2,740,206 | Schatz | Apr. 3, 1956 |